(12) United States Patent
Koutyrine et al.

(10) Patent No.: US 10,824,981 B2
(45) Date of Patent: Nov. 3, 2020

(54) TRANSACTION ORCHESTRATION FOR MICROSERVICE

(71) Applicant: SAP SE, Walldorf (DE)

(72) Inventors: Oleg Koutyrine, Dielheim (DE); Michael Stephan, Vienna (DE)

(73) Assignee: SAP SE, Walldorf (DE)

( * ) Notice: Subject to any disclaimer, the term of this patent is extended or adjusted under 35 U.S.C. 154(b) by 226 days.

(21) Appl. No.: 15/494,957

(22) Filed: Apr. 24, 2017

(65) Prior Publication Data

US 2018/0307514 A1 Oct. 25, 2018

(51) Int. Cl.
*G06Q 10/08* (2012.01)
*G06Q 30/06* (2012.01)
*G06F 9/50* (2006.01)
*G06F 11/07* (2006.01)
*G06F 9/48* (2006.01)

(52) U.S. Cl.
CPC ........... *G06Q 10/083* (2013.01); *G06F 9/48* (2013.01); *G06F 9/4881* (2013.01); *G06F 9/50* (2013.01); *G06F 9/5005* (2013.01); *G06F 11/07* (2013.01); *G06F 11/0706* (2013.01); *G06Q 30/0635* (2013.01)

(58) Field of Classification Search
None
See application file for complete search history.

(56) References Cited

U.S. PATENT DOCUMENTS

| | | | |
|---|---|---|---|
| 10,361,917 B1* | 7/2019 | Parthasarathy | H04L 47/722 |
| 2014/0052616 A1* | 2/2014 | Choi | G06Q 20/02 705/39 |
| 2015/0350316 A1* | 12/2015 | Calder | H04L 67/1095 714/19 |
| 2016/0124742 A1* | 5/2016 | Rangasamy | H04L 47/70 717/103 |

(Continued)

OTHER PUBLICATIONS

"ACID", Wikipedia, [Online]. Retrieved from the Internet: <URL: https://en.wikipedia.org/wiki/ACID>, (Accessed Jan. 27. 2017), 5 pgs.

(Continued)

*Primary Examiner* — Lewis A Bullock, Jr.
*Assistant Examiner* — Melissa A Headly
(74) *Attorney, Agent, or Firm* — Schwegman Lundberg & Woessner, P.A.

(57) ABSTRACT

Various examples are directed to systems and methods for orchestrating a first transaction workflow performed by a plurality of microservices. An orchestration service may write to a first tracking log a first log entry for a first action of the plurality of actions. The first tracking log may be stored at a persistent storage location that, for example, is accessible in the event that the orchestration service crashes. The first log entry may describe an initial state of the first action. The orchestration service may also write a second log entry for a second action of the plurality of actions to the first tracking log. The second log entry may describe an initial state of the second action. The orchestration service may determine that the first microservice successfully completed (Continued)

the first action and that the second microservice failed to complete the second action. The orchestration service may initiate a compensation action to reverse the first action.

20 Claims, 7 Drawing Sheets

(56) References Cited

U.S. PATENT DOCUMENTS

2017/0155743 A1* 6/2017 Sukhija ............... H04L 67/2823

OTHER PUBLICATIONS

"The Netflix Tech Blog: Netflix Conductor: A microservices orchestrator", [Online]. Retrieved from the Internet: <URL: http://techblog.netflix.com/2016/12/netflix-conductor-microservices.html>, (Dec. 12, 2016), 9 pgs.

Fowler, Martin, "Event Sourcing: Capture all changes to an application state as a sequence of events.", [Online]. Retrieved from the Internet: <URL: https://martinfowler.com/eaaDev/EventSourcing.html>, (Dec. 12, 2005), 19 pgs.

Fowler, Martin, et al., "Microservices: a definition of this new architectural term", [Online]. Retrieved from the Internet: <URL: https://martinfaNler.can/articles/microservices.html>, (Mar. 25, 2014), 16 pgs.

* cited by examiner

TRANSACTION ORCHESTRATION FOR MICROSERVICE

TECHNICAL FIELD

This document generally relates to methods and systems for use with computer devices, including networked computing devices. More particularly, this document relates to systems and methods for orchestrating transactions executed at least in part microservices, for example, in a distributed cloud application.

BACKGROUND

Computing systems are often used to perform transactions that include a series of often interrelated actions. Executing some, but not all, of the actions included in a transaction or, in some cases, performing the actions out of order can leave the computing system in an inconsistent state where the transaction is partially complete.

BRIEF DESCRIPTION OF DRAWINGS

The present disclosure is illustrated by way of example and not limitation in the following figures.

DETAILED DESCRIPTION

Figure 1:
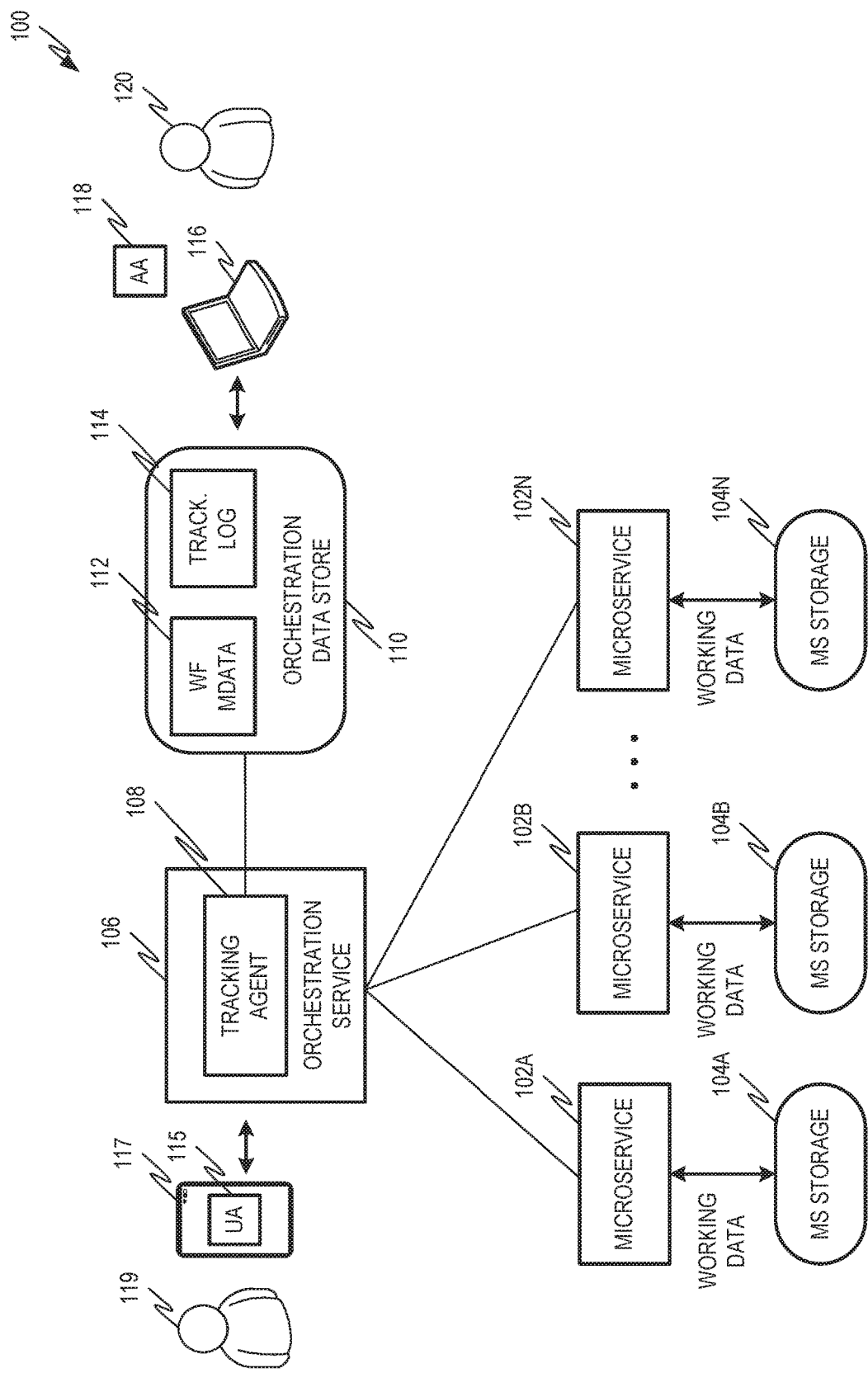
FIG. 1 is a diagram showing one example of an environment for executing a microservices architecture.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods for orchestrating a transaction executed by distributed microservices. A transaction may be described by a transaction workflow including more than one action that makes up the transaction. In some examples, the actions of a transaction workflow are executed by microservices. Different actions of the transaction may be executed by different microservices.

A microservice includes a self-contained application that persists working data at an independent storage location specific to the microservice. For example, a microservice may persist its working data at a storage location that is not accessible to other microservices. This may be accomplished in different ways. In some examples, a microservice is executed by a dedicated virtual machine executing at a server or other computing device. Working data for the microservice may be stored at a virtual disk of the virtual machine. In some examples, a microservice executes as an application at a server or other computing device. The microservice may be assigned a dedicated drive, partition or other suitable storage area at the computing device.

Microservice architectures including multiple microservices are used to perform various transactions. Each microservice in a microservice architecture may perform a discrete action of a transaction workflow. Microservice architectures can provide significant advantages. Microservice architectures often scalable, for example, by instantiating additional examples of the microservices. Also, changes to a microservice architecture can sometimes be implemented by modifying just one or a limited number of microservices without the need to modify the entire architecture. Additionally, the distributed nature of microservice architecture sometimes lends itself to cloud implementations. On the other hand, however, maintaining state consistency in a microservice architecture can present challenges.

Although individual microservices may maintain state consistency for their assigned actions, the distributed nature of microservice architectures can make overall state consistency challenging. Consider an example transaction workflow for checking-out a customer having a shopping cart of products for purchase in an e-commerce environment. The example transaction workflow may include actions for (i) obtaining a list of products; (ii) selecting a shipping option; (iii) redeeming a customer coupon; (iv) determining a total cost of the customer's order; (v) reserving stock for provision to the customer; (vi) accepting payment; and (vii) creating a sales order. If, for example, the sales order creation fails, but the product is reserved at stock and the payment is completed, the overall state of the microservice architecture will be inconsistent. For example, the customer will have paid and an example of the product may be blocked from other sales orders, but without a sales order, the product may not be shipped to the customer.

Various examples utilize an orchestration service to track the state of a transaction workflow executed in a microservice architecture. For example, the orchestration service may maintain a tracking log for a transaction workflow. The tracking log may be stored at a persistent storage location. The orchestration service writes to the transaction log an initial state of the actions making up the transaction workflow. As microservices of the microservice architecture complete or fail to complete assigned actions, the orchestration service may update the tracking log. If the transaction workflow is in an inconsistent state (e.g., if some microservices succeed while others fail), the orchestration service may initiate one or more compensation actions to reverse one or more actions that were successfully completed. In this way, the transaction workflow is executed in an atomic-like manner. In some examples, the transaction workflow is executed in an atomic manner. In other examples, the transaction workflow is not completely atomic, but nonetheless includes some or all of the features described herein. In some examples, if one or more of the compensation actions fails, the orchestration service may send an alert to an administration user so the consistency of the transaction workflow can be restored manually.

FIG. 1 is a diagram showing one example of an environment 100 for executing a microservices architecture. The environment 100 includes a number of microservices 102A, 102B, 102N. Although three microservices 102A, 102B, 102N are shown, any suitable number of microservices may be used. Microservices 102A, 102B, 102N may be executed at any suitable computing devices. In some examples, each microservice 102A, 102B, 102N may be executed at a different computing device. Some or all of microservices, 102A, 102B, 102N, in some examples, are executed as cloud services utilizing a cloud platform such as Amazon Web Services by Amazon.com, Inc., Microsoft Azure® from Microsoft, Inc., etc.

Microservices 102A, 102B, 102N may store working data at respective microservice storage locations 104A, 104B, 104N. Working data may include data used by the respective microservices 102A, 102B, 102N during processing such as, for example, variable states, data received by the microservices 102A, 102B, 102N (e.g., from another microservice or external data source) during execution of an action, etc. A microservice storage location 104A, 104B, 104N may be dedicated to its respective microservice 102A, 102B, 102N. For example, a microservice storage location 104A may be accessible to the microservice 102A, but not to other microservices 102B, 102N. Microservice storage locations 104A, 104B, 104N may be implemented in various different ways. For example, a microservice storage location 104A, 104B, 104N may be or include a virtual drive of a virtual machine executing the microservice, a dedicated disk partition or other suitable storage area at a computing device executing the microservice, etc.

The environment 100 also includes an orchestration service 106. The orchestration service 106 may call the various microservices 102A, 102B, 102N to execute and/or compensate actions of a transaction workflow, for example, as described herein. The orchestration service 106 may also track and manage the state of a transaction workflow to maintain consistency and/or generate an alert if consistency cannot be maintained. In the example of FIG. 1, the orchestration service 106 includes a tracking agent 108. The tracking agent may be or include a library or other subcomponent of the orchestration service 106. The tracking agent 108 may track the state of a transaction workflow, which may include tracking the state of one or more actions of the transaction workflow executed by the microservices 102A, 102B, 102N. The tracking agent 108 may also maintain a tracking log 114 which may indicate the state of a transaction workflow including, for example, state data describing states of microservices 102A, 102B, 102N that execute actions of the transaction workflow.

The orchestration service 106 and/or tracking agent 108 may be executed at any suitable computing device such as, for example, a server computing device. In some examples, the orchestration service 106 and/or tracking agent 108 is executed by a cloud service, by a dedicated server, in or as a virtual machine executed at a dedicated sever, etc. In some examples, the orchestration service 106 and/or tracking agent 108 are executed as microservices that are part of the implemented microservice architecture.

The orchestration service 106 may utilize an orchestration data store 110. The orchestration data store 110 may store various data used by the orchestration service 106 to manage a transaction workflow. For example, the orchestration service 106 may store workflow metadata 112. Workflow metadata 112 may describe a transaction workflow including, for example, relationships between the actions of the transaction workflow. The orchestration data store 110 may also store the tracking log 114.

The orchestration data store 110, in some examples, is persistent. For example, the orchestration data store 110 may be durable in the sense that it persists if or when the orchestration service 106 or tracking agent 108 crashes or otherwise fails. In this way, the state of a transaction workflow may persist in the event of failure of the orchestration service 106 or tracking agent 108. In some examples, the orchestration data store 110 may be or include a database at storage hardware (e.g., a disk drive) connected locally to the computing device that executes the orchestration service 106 or tracking agent 108. For example, the storage hardware device may be in communication with the processor unit via a bus or other connection hardware. In another example, the orchestration data store 110 may be implemented using a "database as a service" where a connection to the database occurs over a network yet the database storage is logically local to the orchestration service 106 or tracking agent 108. For example, a "database as a service" may not be shared with other components of the environment 100.

The orchestration service 106 may be in communication with one or more user applications 115 executing at one or more user computing devices 117. User computing devices 117 may include any suitable computing device including, for example, a laptop computer, a table computer, a desktop computer, etc. A user 119 may utilize the user computing device 117 and user application 115, for example, to request workflows to be performed by the microservice infrastructure, as described herein. For example, a user application may include an e-commerce application that enables the user to execute an e-commerce transaction as described herein. For example, the orchestration service 106 may provide an application programming interface (API) providing the user application 115 with access to workflows to be executed by the microservice architecture.

An administrative user 120 may utilize an administrative user device 116 and administrative application 118 to track, monitor, and/or modify a microservice architecture in the environment 100, for example, as described herein. For example, the administrative application 118 may directly access a computing device managing the orchestration data store 110 to directly access the workflow metadata 112 and/or tracking log 114.

Figure 2:
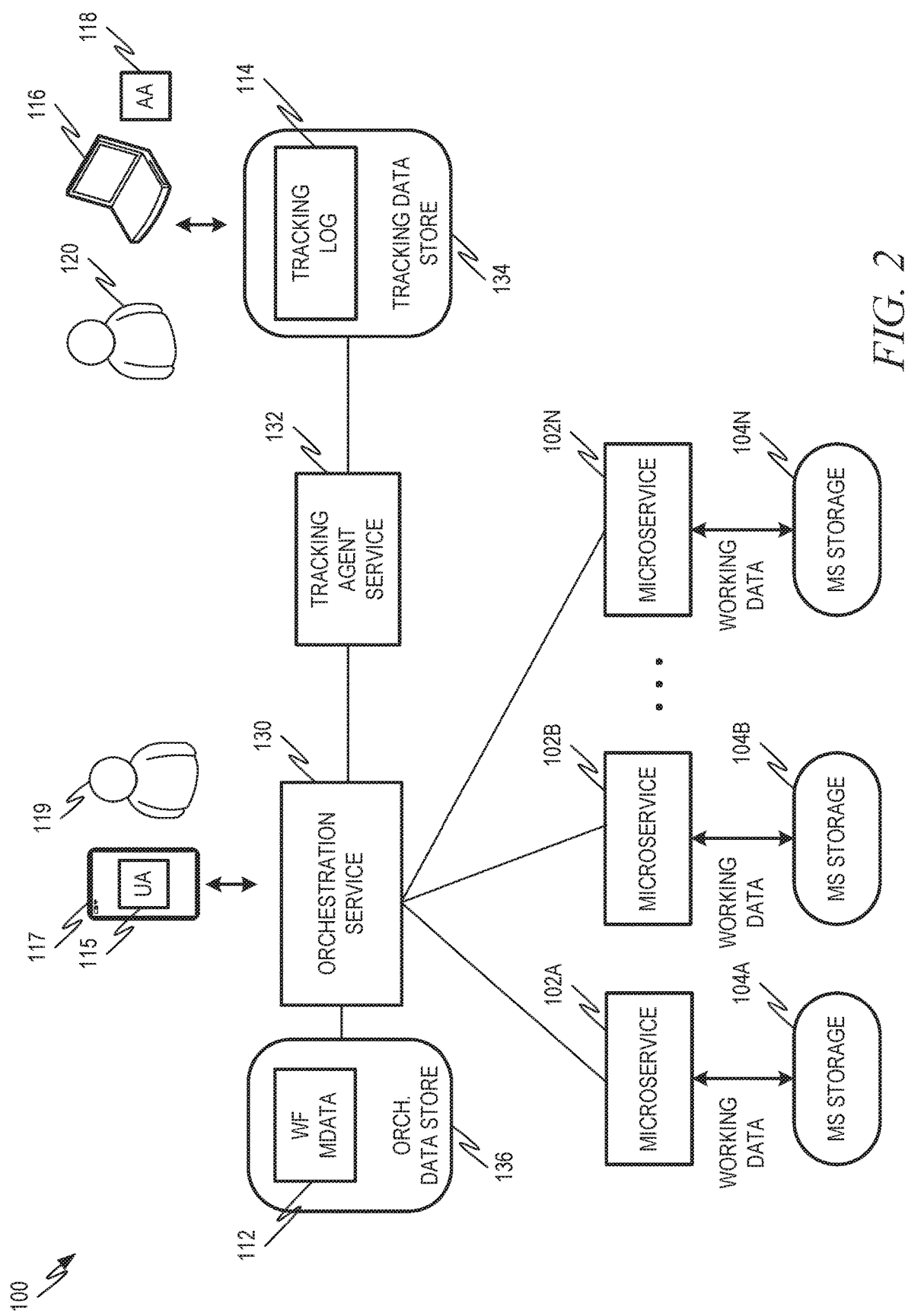
FIG. 2 is a diagram showing another example of an alternate configuration of the environment.

FIG. 2 is a diagram showing another example of an alternate configuration of the environment 100. In the example of FIG. 2, an orchestration service 130 utilizes a separate tracking agent service 132. For example, the tracking agent service 132 may be implemented as a microservice, similar to microservices 102A, 102B, 102N. The orchestration service 130 may utilize an orchestration data storage 136 similar to the storage location 110 described herein. The tracking agent service 132 may utilize a tracking data store 134. The tracking agent service 132 may maintain the tracking log 114 at the tracking data store 134. The tracking data store 134, for example, may be a microservice data storage similar to microservice storage locations 104A, 104B, 104N described herein. The tracking data store 134 may be configured to persist and be accessible to the orchestration service 130, the tracking agent service 132 or their successors in the event of crash or failure. In the example of FIG. 2, the administrative user 120, via the administrative application 118, may access the tracking log 114, for example, by communicating with the computing device managing the tracking data store 134 to coordinate workflows s described herein.

Figure 3:
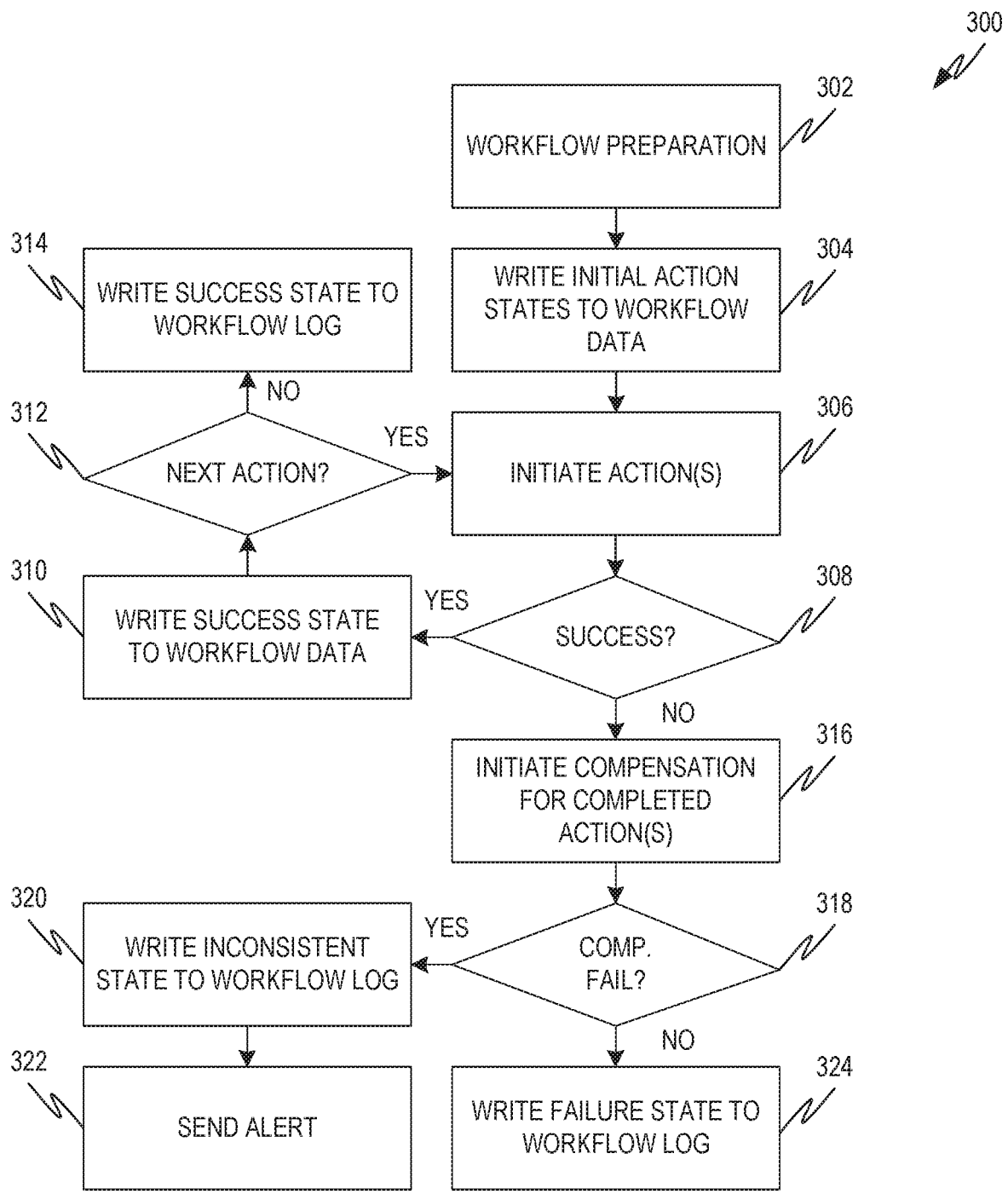
FIG. 3 is a flowchart showing one example of a process flow that may be executed by an orchestration service and tracking agent to orchestrate a microservice architecture.

FIG. 3 is a flowchart showing one example of a process flow 300 that may be executed by an orchestration service and/or tracking agent to orchestrate a microservice architecture. The process flow 300 may be executed by any combination of orchestration service and tracking agent. In some examples, the process flow 300 is executed by the orchestration service 106 and tracking agent 108 described with respect to FIG. 1. Also, in some examples, the process flow 300 is executed by an orchestration service 130 and separate tracking agent service 132 as described with respect to FIG. 2. Additionally, in some examples, the process flow 300 is executed by a single application that performs functions of both an orchestration service and of a tracking agent.

At operation 302, an orchestration service may prepare a transaction workflow for execution. Preparing the transaction workflow may include, for example, receiving or generating workflow metadata 112. Workflow metadata 112 may describe, for example, the actions making the transaction workflow, descriptions of the actions, and/or relationships, such as dependencies, between the actions.

Workflow metadata 112 may indicate, for example, whether an action should be compensated (e.g., reversed) if the transaction workflow fails. Actions that modify the state of the microservices architecture, for example, by writing data, may be subject to compensation while some read-only actions may not be compensated. Referring again to the e-commerce example above, actions for reserving stock or redeeming a customer coupon may be subject to compensation. That is, these actions may be reversed if the transaction workflow reaches an inconsistent state. For example, if a customer's transaction fails, stock should not be reserved for the customer and the customer's coupon should not be redeemed. Accordingly, if these actions are in a success state while the overall transaction workflow is in an inconsistent state, the completed actions should be compensated. In some examples, the workflow metadata 112 also describes compensation for an action. For example, the workflow metadata may include code and/or service calls to one or more microservices 102A, 102B, 102N to compensate a completed action.

Relationships or dependencies between actions of a transaction workflow may describe an order in which the actions should be performed and, for example, whether an action should wait for the successful completion of another action before being executed. For example, referring again to the e-commerce example, an action for determining a total cost of the customer's order should not be executed until an action obtaining a list of products is completed. Some actions, however, may be executed simultaneously.

At operation 304, the orchestration service and/or tracking agent may write initial states to the tracking log 114 for the transaction workflow. The initial states may indicate the respective states of the transaction workflow and the individual actions. For example, the orchestration service may update the state of the transaction workflow itself to "begin," "in progress," or another similar state. The initial states of the actions may also be set to "begin," "in progress" or another similar state. To indicate the states of the actions, the orchestration service and/or tracking agent may write one or more log entries to the tracking log 114.

At operation 306, the orchestration service may initiate one or more actions of the transaction workflow. Initiating an action may include sending an action request message to a microservice 102A, 102B, 102N that will execute the action. The action request message, in some examples, may be sent to a microservice, for example, via an Application Program Interface (API) implemented by the respective microservice 102A, 102B, 102N. The action or actions initiated at operation 306 may depend, for example, on the workflow metadata 112. For example, actions initiated at operation 306 may include actions that either do not depend on any other actions or that depend on actions that have already been successfully completed. Initiating an action may also include writing initial states for one or more actions making up the workflow to the tracking log 114.

At operation 308, the orchestration service and/or tracking agent may determine if the action or actions initiated at operation 306 are successful. In some examples, when a microservice 102A, 102B, 102N successfully completes an action, it may send a success message to the orchestration service and/or tracking agent. In some examples, a microservice 102A, 102B, 102N may send a failure message to the orchestration service and/or tracking agent if the microservice 102A, 102B, 102N fails to perform its assigned action. Also, in some examples, the orchestration service and/or tracking agent may determine that a microservice 102A, 102B, 102N has failed to perform its assigned action if the microservice 102A, 102B, 102N failed to return any message within a threshold time.

If, at operation 308, the orchestration service and/or tracking agent determines that an action has been successfully completed, for example, upon receiving a success message from the microservice 102A, 102B, 102N executing the action, the orchestration service and/or tracking agent may, at operation 310, write to the tracking log a log entry indicating that the action is at a success state. At operation 312, the orchestration service and/or tracking agent may determine if there are additional actions in the transaction workflow. If no more actions remain, the orchestration service and/or tracking agent may, at operation 314, write to the tracking log a log entry indicating that the transaction workflow's state is success.

If additional unexecuted actions do remain in the workflow at operation 312, the orchestration service and/or tracking agent may, at operation 306, initiate one or more of the remaining actions. For example, the orchestration service and/or tracking agent may initiate execution of one or more actions that either do not depend on other actions or depend only on other actions that have previously been successfully executed. For example, the orchestration service and/or tracking agent may query the tracking log to determine whether all predicate actions for a new actions are in a successful state before initiating the action.

Referring back to operation 308, if the orchestration service and/or tracking agent determines that an initiated action is unsuccessful, it may initiate compensation actions for the transaction workflow at operation 316. For example, the orchestration service and/or tracking agent may request that one or more microservices 102A, 102B, 102N act to reverse some or all of the previously-completed actions of the transaction workflow. In some examples, a microservice 102A, 102B, 102N that executes a compensation action is the same microservice 102A, 102B, 102N that originally executed the corresponding action or a different microservice. In some examples, the orchestration service and/or tracking agent also writes a log entry to the tracking log 114 indicating that the action is in a failure state.

At operation 318, the orchestration service and/or tracking agent may determine if one or more compensation actions have failed. If one or more compensation actions have failed, the orchestration service may update the tracking log to indicate that the state of the transaction workflow is inconsistent. At optional operation 322, the orchestration service and/or tracking agent sends an alert message to an administrative user 120. For example, the alert message may be sent to an administrative application 118 executing at an administrative computing device 116 of the administrative user 120. In some examples, the alert message, when received by the administrative application 118, may prompt the administrative application 118 to sound an alarm or other indicator to the administrative user 120 of the inconsistent state of the transaction workflow.

If, at operation 318, the orchestration service and/or tracking agent determines that no compensation actions have failed (e.g., that all compensation actions have succeeded), the orchestration service and/or tracking agent may, at operation 324 write to the tracking log failure data indicating that the transaction workflow is in a failed state. In some examples, because any necessary compensation actions are completed before a transaction is indicated to be in the failed state, the failed state may be consistent.

Figure 4:
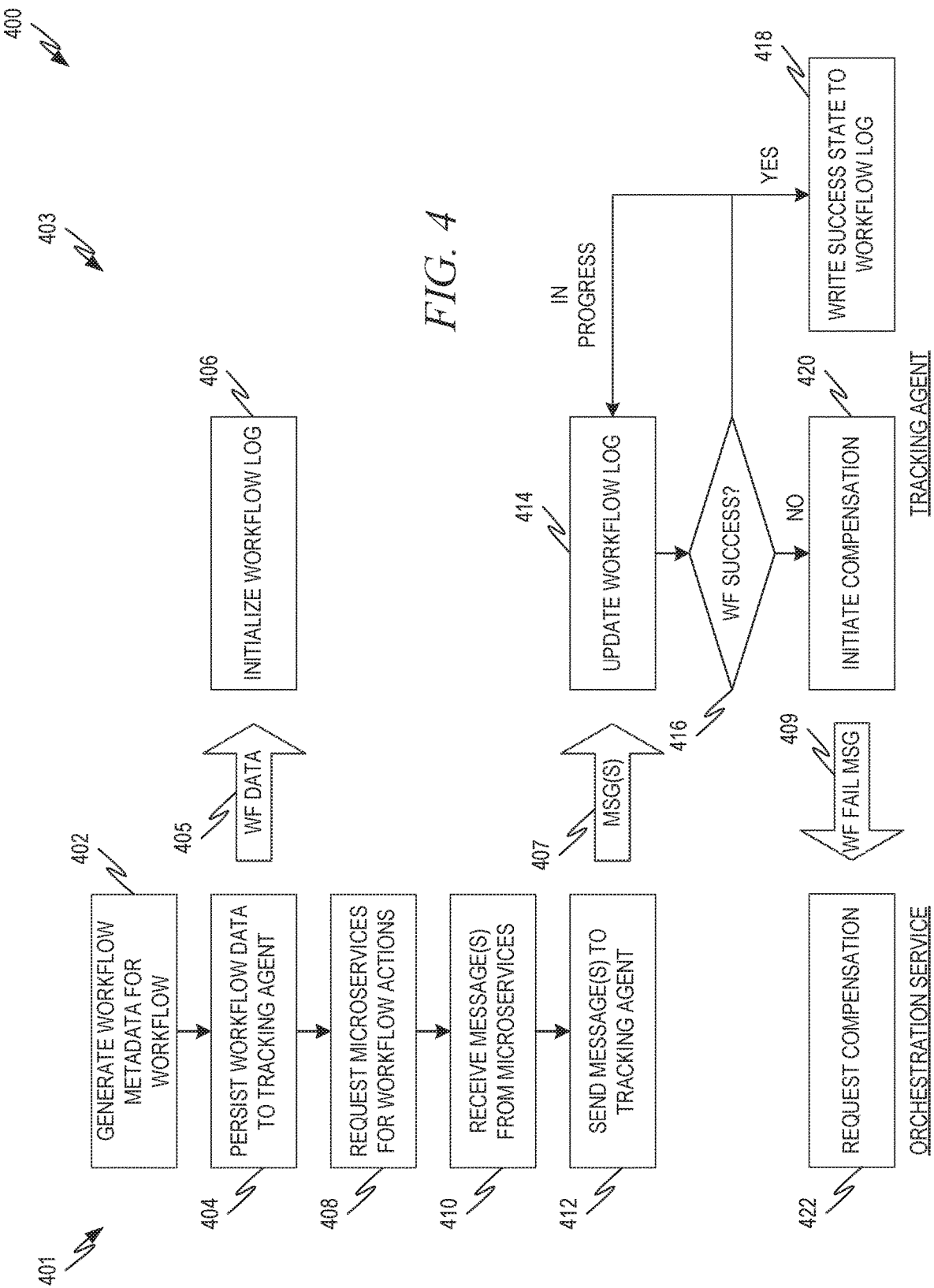
FIG. 4 is a flowchart showing one example of a process flow that may be executed by an orchestration agent and a tracking agent to orchestrate a microservice architecture.

FIG. 4 is a flowchart showing one example of a process flow 400 that may be executed by an orchestration agent and a tracking agent to orchestrate a microservice architecture. The process flow 400 describes one example set of interactions between the orchestration service 106 and tracking agent 108 of FIG. 1 and/or between the orchestration service 130 and tracking agent service 132 of FIG. 2. In FIG. 4, a column 401 including operations executed by the orchestration service and a column 403 includes operations performed by the tracking agent (or tracking agent service).

At operation 402, the orchestration service may generate workflow metadata 112, for example, as described above with respect to operation 302. In some examples, this may involve determining the initial states of the actions making up the workflow. At operation 404, the orchestration service may send to the tracking agent workflow data 405. The workflow data 405 may include, for example, some or all of the workflow metadata described at operation 402. The tracking agent may receive the workflow data 405 and initialize the tracking log 114 at operation 406. For example, the tracking agent may write one or more log entries to the tracking log 114 that indicating the initial states of the transaction workflow and the constituent actions.

The orchestration service, at operation 408, may initialize one or more actions of the transaction workflow, for example, by requesting microservices 102A, 102B, 102N to execute the actions. At operation 410, the orchestration service may receive one or more messages 407 from microservices 102A, 102B, 102N. For example, the messages 407 may indicate that the sending microservice 102A, 102B, 102N has successfully completed its action or that the sending microservice 102A, 102B, 102N has not successfully completed its action. At operation 412, the orchestration service may persist the message or messages 407 received from microservices 102A, 102B, 102N to the tracking agent, for example, by sending the received messages or other messages indicating the contents of the received messages to the tracking agent. In some examples, the orchestration service may continuously persist messages 407 to the tracking agent, for example, as the messages 407 (or other messages) are received from microservices 102A, 102B, 102N. In some examples, microservices 102A, 102B, 102N are configured to send messages 407 directly to the tracking agent, for example, bypassing the orchestration services.

At operation 414, the tracking agent may update the tracking log 114 based on the messages 407. For example, if a message 407 indicates that a microservice 102A, 102B, 102N has failed an action, the tracking agent may write a log entry to the tracking log 114 indicating that the action is in a failed state. If a message 407 indicates that a microservice 102A, 102B, 102N has successfully completed an action, the tracking agent may write a log entry to the tracking log 114 indicating that the action is in a success state.

At operation 416, the tracking agent may determine if the transaction workflow is successful. For example, if the tracking agent determines that all actions of the transaction workflow have been successfully completed (e.g., the tracking log 114 indicates a success state for the actions), then the tracking agent may, at operation 418 write to the tracking log 114 a log entry indicating a success state for the transaction workflow. If the transaction workflow is still in an in-progress state, for example, if no actions have failed but some actions are still in progress, then the tracking agent may return to operation 414 to listen for additional microservice messages 407. If the transaction workflow is in an inconsistent state, for example, if an action has failed, then the tracking agent may initiate compensation of any previously completed actions at operation 420. To initiate compensation, the tracking agent may send a workflow failure message 409 to the orchestration service. In response, the orchestration service may request compensation actions for one or more of the actions of the transaction workflow that were previously completed at operation 422. For example, the orchestration service may call one or more microservices 102A, 102B, 102N to execute the compensation actions.

Although operation 416 is shown as being performed by the tracking agent, in some examples, the orchestration service may determine if the workflow is a success. If the workflow is a success, the orchestration service may report the success of the workflow to the tracking agent. If the workflow is not a success, the orchestration service may request that the tracking agent initiate compensation, for example, as described with respect to operation 420.

Figure 5:
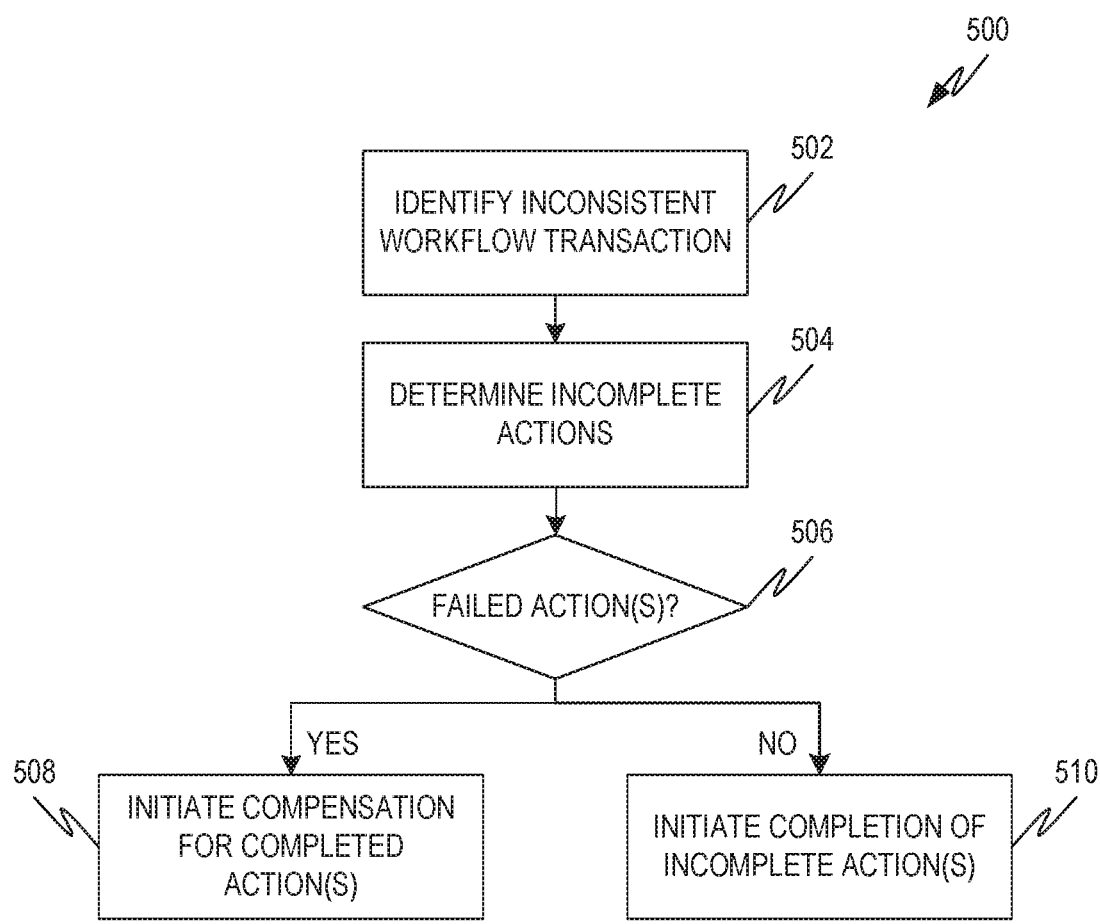
FIG. 5 is a flowchart showing one example of a process flow that may be executed by an orchestration service and/or tracking agent to resolve an in-process transaction workflow.

FIG. 5 is a flowchart showing one example of a process flow 500 that may be executed by an orchestration service and/or tracking agent to resolve an in-process transaction workflow. The process flow 500 may be executed by any combination of orchestration service and tracking agent. In some examples, the process flow 300 is executed by the orchestration service 106 and tracking agent 108 described with respect to FIG. 1. Also, in some examples, the process flow 300 is executed by an orchestration service 130 and separate tracking agent service 132 as described with respect to FIG. 2. Additionally, in some examples, the process flow 500 is executed by a single application that performs functions of both an orchestration service and of a tracking agent.

At operation 502, the orchestration service and/or tracking agent may identify an inconsistent workflow transaction. For example, orchestration service and/or tracking agent may review an orchestration data store 110 or tracking data store 134 to identify tracking logs 114 with states that are inconsistent (e.g., in-progress). In some examples, the orchestration service and/or tracking agent may determine that it should act on an inconsistent workflow transaction if the workflow transaction has been inconsistent for a threshold time. For example, log entries at the tracking logs 114 may be timestamped. The orchestration service and/or the tracking agent may check the timestamp of log entries at a tracking log 114 in an inconsistent state. If the timestamp is of more than a threshold age (e.g., if more than a threshold time has passes since the timestamp), the orchestration service and/or tracking agent may conclude that the original orchestration service and/or tracking agent has crashed and may continue to process the tracking log 114. In some examples, another component may identify tracking logs 114 with states that are inconsistent and instantiate or otherwise call the orchestration service and/or tracking agent to resolve the inconsistency.

At operation 504, the orchestration service and/or tracking agent may determine incomplete actions in the transaction workflow. Incomplete actions may be actions that do not have a success state indicated at the tracking log 114. For example, an action may be incomplete if it has a state indicating that the action has not been started, or if it has a state indicating that the action has started, but failed.

At operation 506, the orchestration service and/or tracking agent may determine if any of the incomplete actions identified at operation 504 have a state indicating that the actions have failed. If there are one or more failed actions, the orchestration service and/or tracking agent may, at operation 508, initiate compensation for actions of the transaction workflow that have a state at the tracking log indicating success. If there are no failed actions, the orchestration service and/or tracking agent may initiate completion of the remaining actions of the transaction workflow at operation 510. In some examples, the orchestration service and/or tracking agent, in lieu of completing the transaction workflow, may always initiate compensation for completed actions.

Figure 6:
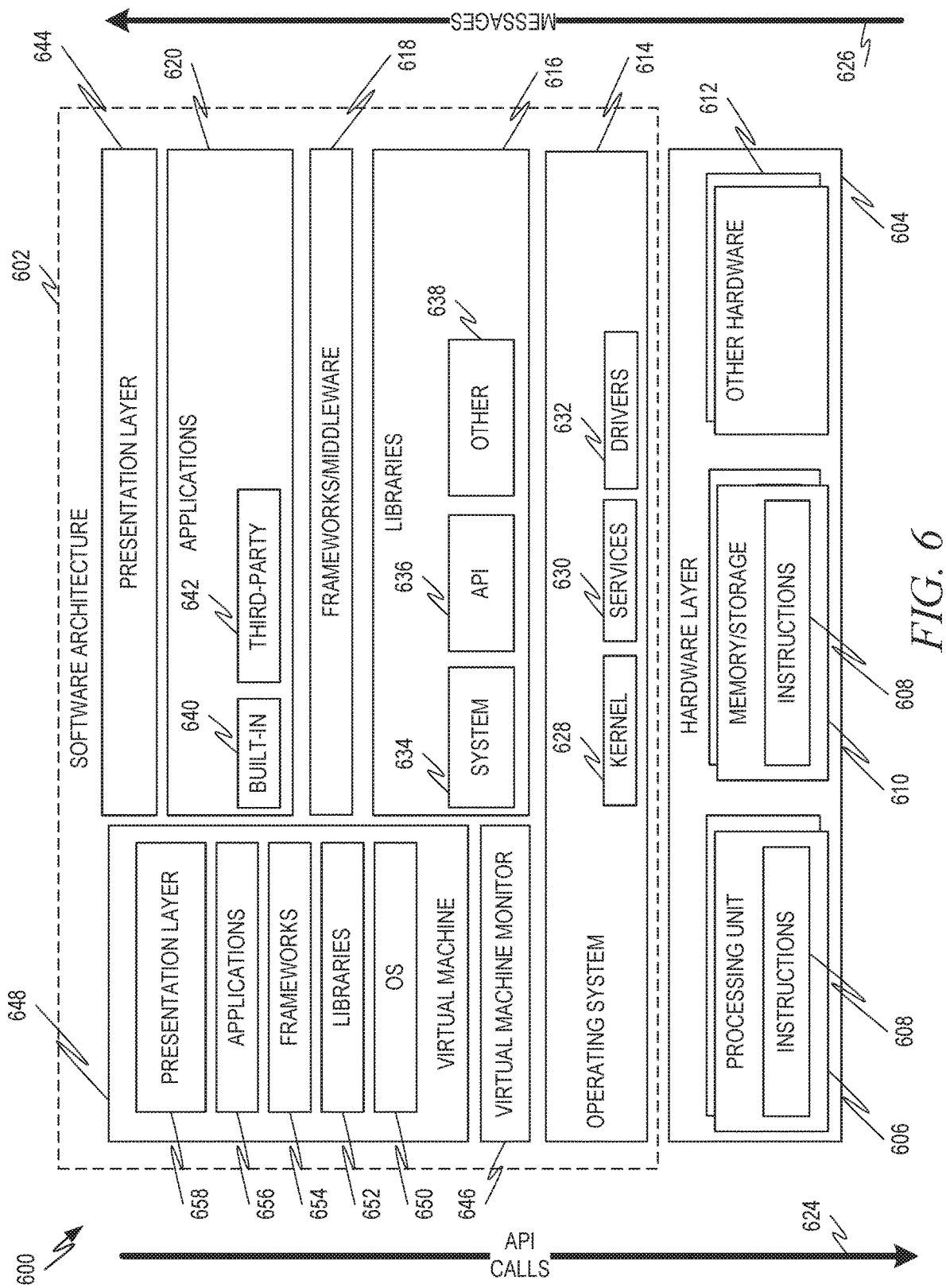
FIG. 6 is a block diagram showing one example of a software architecture for a computing device.

FIG. 6 is a block diagram 600 showing one example of a software architecture 602 for a computing device. The architecture 602 may be used in conjunction with various hardware architectures, for example, as described herein. FIG. 6 is merely a non-limiting example of a software architecture and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system 700 of FIG. 7.

The representative hardware layer 604 comprises one or more processing units 606 having associated executable instructions 608. Executable instructions 608 represent the executable instructions of the software architecture 602, including implementation of the methods, modules, subsystems, and components, and so forth described herein and may also include memory and/or storage modules 610, which also have executable instructions 608. Hardware layer 604 may also comprise other hardware as indicated by other hardware 612 which represents any other hardware of the hardware layer 604, such as the other hardware illustrated as part of computer system 700.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620 and presentation layer 644. Operationally, the applications 620 and/or other components within the layers may invoke application programming interface (API) calls 624 through the software stack and access a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules. In some examples, libraries 638 may provide one or more APIs serviced by a message oriented middleware.

The frameworks 618 (also sometimes referred to as middleware) may provide a higher-level common infrastructure that may be utilized by the applications 620 and/or other software components/modules. For example, the frameworks 618 may provide various graphic user interface (GUI) functions, high-level resource management, high-level location services, and so forth. The frameworks 618 may provide a broad spectrum of other APIs that may be utilized by the applications 620 and/or other software components/modules, some of which may be specific to a particular operating system or platform.

The applications 620 includes built-in applications 640 and/or third party applications 642. Examples of representative built-in applications 640 may include, but are not limited to, a contacts application, a browser application, a book reader application, a location application, a media application, a messaging application, and/or a game application. Third party applications 642 may include any of the built in applications as well as a broad assortment of other applications. In a specific example, the third party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 642 may invoke the API calls 624 provided by the mobile operating system such as operating system 614 to facilitate functionality described herein.

The applications 620 may utilize built in operating system functions (e.g., kernel 628, services 630 and/or drivers 632), libraries (e.g., system 634, APIs 636, and other libraries 638), frameworks/middleware 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine as well as the interface with the host operating system (i.e., operating system 614). A software architecture executes within the virtual machine such as an operating system 650, libraries 652, frameworks/middleware 654, applications 656 and/or presentation layer 658. These layers of software architecture executing within the virtual machine 648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
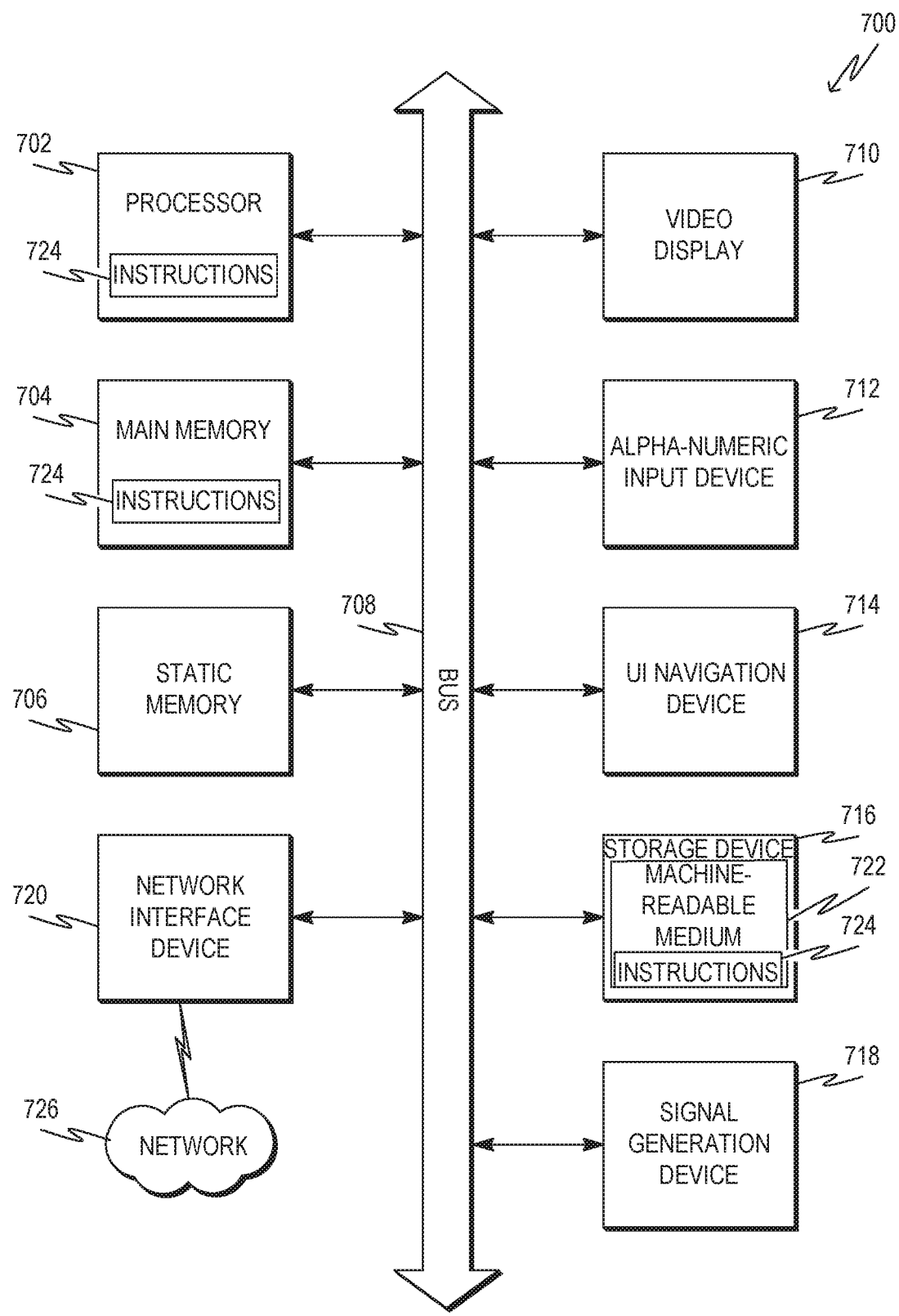
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

Example 1 is a system for orchestrating a first transaction workflow performed by a plurality of microservices, the system comprising: a computing device comprising a processor unit programmed to execute at least an orchestration service, wherein the orchestration service is programmed to perform operations comprising: writing to a first tracking log a first log entry for a first action of a plurality of actions of the first transaction workflow, wherein the first log entry describes an initial state of the first action, wherein the writing to the first tracking log comprises writing to the first tracking log at a persistent storage location; writing to the first tracking log, a second log entry for a second action of the plurality of actions, wherein the second log entry describes an initial state of the second action; determining, using the processor unit, that a first microservice of the plurality of microservices successfully completed the first action; determining, using the processor unit, that a second microservice of the plurality of microservices failed to complete the second action; and initiating a compensation action to reverse the first action.

In Example 2, the subject matter of Example 1 optionally includes wherein the persistent storage location comprises a database at a storage hardware device locally connected to the computing device.

In Example 3, the subject matter of any one or more of Examples 1-2 optionally includes wherein the orchestration service is further programmed to perform operations comprising requesting that the first microservice execute the compensation action.

In Example 4, the subject matter of any one or more of Examples 1-3 optionally includes wherein the orchestration service is further programmed to perform operations comprising: determining that the compensation action has failed; and sending an alert message to an administrative user, wherein the alert message indicates that the compensation action has failed.

In Example 5, the subject matter of any one or more of Examples 1-4 optionally includes wherein the orchestration service is further programmed to perform operations comprising: determining that a second tracking log for a second transaction workflow indicates an inconsistent state; determining based at least in part on the second tracking log, that a first action of the second transaction workflow has been completed; and request that a third microservice execute a compensation action to reverse the first action of the second transaction workflow.

In Example 6, the subject matter of any one or more of Examples 1-5 optionally includes wherein the orchestration service is further programmed to perform operations comprising: determining that a second tracking log for a second transaction workflow indicates an inconsistent state; determining based at least in part on the second tracking log, that a first action of the second transaction workflow has been completed and that a second action of the second transaction workflow has not been completed; and requesting that a third microservice execute the second action of the second transaction workflow.

In Example 7, the subject matter of any one or more of Examples 1-6 optionally includes wherein the orchestration service is further programmed to perform operations comprising determining that a second tracking log for a second transaction workflow indicates an inconsistent state at least in part based on determining that a timestamp for a completed action of the second transaction workflow is older than a threshold age.

In Example 8, the subject matter of any one or more of Examples 1-7 optionally includes wherein the orchestration service is further programmed to perform operations comprising: accessing a first workflow metadata describing the first transaction workflow, wherein the first workflow metadata describes a plurality of actions of the first transaction workflow; requesting that a first microservice of the plurality of microservices execute the first action utilizing first microservice storage; and requesting that a second microservice of the plurality of microservices execute the second action.

In Example 9, the subject matter of any one or more of Examples 1-8 optionally includes wherein writing the first log entry to the first tracking log comprises sending a request to a tracking agent service executing at a second computing device, wherein the first tracking log is stored at a data storage device locally connected to the second computing device.

Example 10 is a method for orchestrating a first transaction workflow performed by a plurality of microservices, the method comprising: writing, by an orchestration service executing at a first computing device and to a first tracking log, a first log entry for a first action of a plurality of actions of the first transaction workflow, wherein the first log entry describes an initial state of the first action, wherein the writing to the first tracking log comprises writing to the first tracking log at a persistent storage location, and wherein the first computing device comprises a processor unit and a memory; writing, by the orchestration service and to the first tracking log, a second log entry for a second action of the plurality of actions, wherein the second log entry describes an initial state of the second action; determining, by the orchestration service that a first microservice of the plurality of microservices successfully completed the first action;

determining, by the orchestration service, that a second microservice of the plurality of microservices failed to complete the second action; and initiating, by the orchestration service, a compensation action to reverse the first action.

In Example 11, the subject matter of Example 10 optionally includes wherein the persistent storage location comprises a database at a storage hardware device locally connected to the first computing device.

In Example 12, the subject matter of any one or more of Examples 10-11 optionally includes requesting, by the orchestration service, that the first microservice execute the compensation action.

In Example 13, the subject matter of any one or more of Examples 10-12 optionally includes determining, by the orchestration service, that the compensation action has failed; and sending an alert message to an administrative user, wherein the alert message indicates that the compensation action has failed.

In Example 14, the subject matter of any one or more of Examples 10-13 optionally includes determining, by the orchestration service, that a second tracking log for a second transaction workflow indicates an inconsistent state; determining, by the orchestration service, based at least in part on the second tracking log, that a first action of the second transaction workflow has been completed; and request, by the orchestration service, that a third microservice execute a compensation action to reverse the first action of the second transaction workflow.

In Example 15, the subject matter of any one or more of Examples 10-14 optionally includes determining, by the orchestration service, that a second tracking log for a second transaction workflow indicates an inconsistent state; determining, by the orchestration service, based at least in part on the second tracking log, that a first action of the second transaction workflow has been completed and that a second action of the second transaction workflow has not been completed; and requesting, by the orchestration service, that a third microservice executed the second action of the second transaction workflow.

In Example 16, the subject matter of any one or more of Examples 10-15 optionally includes determining, by the orchestration service, that a second tracking log for a second transaction workflow indicates an inconsistent state at least in part based on determining that a timestamp for a completed action of the second transaction workflow is older than a threshold age.

In Example 17, the subject matter of any one or more of Examples 10-16 optionally includes accessing, by the orchestration service, a first workflow metadata describing the first transaction workflow, wherein the first workflow metadata describes a plurality of actions of the first transaction workflow; requesting, by the orchestration service, that a first microservice of the plurality of microservices execute the first action utilizing first microservice storage; and requesting, by the orchestration service, that a second microservice of the plurality of microservices execute the second action.

In Example 18, the subject matter of any one or more of Examples 10-17 optionally includes wherein writing the first log entry to the first tracking log comprises sending a request to a tracking agent service executing at a second computing device, wherein the first tracking log is stored at a data storage device locally connected to the second computing device.

Example 19 is a machine-readable medium comprising instructions thereon that, when executed by a processor unit, causes the processor unit to perform operations comprising: writing to a first tracking log a first log entry for a first action of a plurality of actions of a first transaction workflow, wherein the first log entry describes an initial state of the first action, wherein the writing to the first tracking log comprises writing to the first tracking log at a persistent storage location; writing to the first tracking log, a second log entry for a second action of the plurality of actions, wherein the second log entry describes an initial state of the second action; determining that a first microservice of a plurality of microservices for executing the first transaction workflow successfully completed the first action; determining that a second microservice of the plurality of microservices failed to complete the second action; and initiating a compensation action to reverse the first action.

In Example 20, the subject matter of Example 19 optionally includes instructions thereon that, when executed by the processor unit, cause the processor unit to perform operations comprising: accessing a first workflow metadata describing the first transaction workflow, wherein the first workflow metadata describes a plurality of actions of the first transaction workflow; requesting that a first microservice of the plurality of microservices execute the first action utilizing first microservice storage; and requesting that a second microservice of the plurality of microservices execute the second action.

What is claimed is:

1. A system for orchestrating a first transaction workflow performed by a plurality of microservices, the system comprising:

a computing device comprising a processor unit programmed to execute at least an orchestration service, wherein the orchestration service is programmed to perform operations comprising:

writing to a first tracking log a first log entry for a first action of a plurality of actions of the first transaction workflow, wherein the first log entry describes an initial state of the first action, wherein the writing to the first tracking log comprises writing to the first tracking log at a persistent storage location;

writing to the first tracking log, a second log entry for a second action of the plurality of actions, wherein the second log entry describes an initial state of the second action;

determining, using the first tracking log, that a first microservice of the plurality of microservices successfully completed the first action;

determining, using the first tracking log, that the second action is incomplete, wherein the second action was to be executed by a second microservice of the plurality of microservices;

determining that the second action is associated at the first tracking log with a failure state;

accessing, from the persistent storage location, workflow metadata describing the first transaction workflow;

determining that the workflow metadata indicates that the first action should be compensated; and responsive to determining that the second action is associated with the failure state and the determining that the workflow metadata indicates that the first action should be compensated, requesting that the first microservice execute a compensation action to reverse the first action.

2. The system of claim 1, wherein the persistent storage location comprises a database at a storage hardware device locally connected to the computing device.

3. The system of claim 1, wherein the orchestration service is further programmed to perform operations comprising sending an alert message to an administrative user, wherein the alert message indicates that the compensation action has failed.

4. The system of claim 1, wherein the orchestration service is further programmed to perform operations comprising:
   determining that a second tracking log for a second transaction workflow indicates an inconsistent state;
   determining based at least in part on the second tracking log, that a first action of the second transaction workflow has been completed; and
   request that a third microservice execute a compensation action to reverse the first action of the second transaction workflow.

5. The system of claim 1, wherein the orchestration service is further programmed to perform operations comprising:
   determining that a second tracking log for a second transaction workflow indicates an inconsistent state;
   determining based at least in part on the second tracking log, that a first action of the second transaction workflow has been completed and that a second action of the second transaction workflow has not been completed;
   determining, using the first tracking log, that the second action of the second transaction workflow is not associated at the first tracking log with a failure state; and
   responsive to determining that the second action of the second transaction workflow is not associated with the failure state, requesting that a third microservice execute the second action of the second transaction workflow.

6. The system of claim 1, wherein the orchestration service is further programmed to perform operations comprising determining that a second tracking log for a second transaction workflow indicates an inconsistent state at least in part based on determining that a timestamp for a completed action of the second transaction workflow is older than a threshold age.

7. The system of claim 1, wherein the orchestration service is further programmed to perform operations comprising:
   accessing a first workflow metadata describing the first transaction workflow, wherein the first workflow metadata describes a plurality of actions of the first transaction workflow;
   requesting that a first microservice of the plurality of microservices execute the first action utilizing first microservice storage; and
   requesting that a second microservice of the plurality of microservices execute the second action.

8. The system of claim 1, wherein writing the first log entry to the first tracking log comprises sending a request to a tracking agent service executing at a second computing device, wherein the first tracking log is stored at a data storage device locally connected to the second computing device.

9. A method for orchestrating a first transaction workflow performed by a plurality of microservices, the method comprising:
   writing, by an orchestration service executing at a first computing device and to a first tracking log, a first log entry for a first action of a plurality of actions of the first transaction workflow, wherein the first log entry describes an initial state of the first action, wherein the writing to the first tracking log comprises writing to the first tracking log at a persistent storage location, and wherein the first computing device comprises a processor unit and a memory;
   writing, by the orchestration service and to the first tracking log, a second log entry for a second action of the plurality of actions, wherein the second log entry describes an initial state of the second action;
   determining, by the orchestration service that a first microservice of the plurality of microservices successfully completed the first action;
   determining, by the orchestration service, that the first tracking log indicates that the second action is incomplete, wherein the second action was to be executed by a second microservice of the plurality of microservices;
   determining that the second action is associated at the first tracking log with a failure state;
   accessing, from the persistent storage location, workflow metadata describing the first transaction workflow;
   determining that the workflow metadata indicates that the first action should be compensated; and
   responsive to determining that the second action is associated with the failure state and the determining that the workflow metadata indicates that the first action should be compensated, requesting, by the orchestration service, that the first microservice execute a compensation action to reverse the first action.

10. The method of claim 9, wherein the persistent storage location comprises a database at a storage hardware device locally connected to the first computing device.

11. The method of claim 9, further comprising sending an alert message to an administrative user, wherein the alert message indicates that the compensation action has failed.

12. The method of claim 9, further comprising:
    determining, by the orchestration service, that a second tracking log for a second transaction workflow indicates an inconsistent state;
    determining, by the orchestration service, based at least in part on the second tracking log, that a first action of the second transaction workflow has been completed; and
    request, by the orchestration service, that a third microservice execute a compensation action to reverse the first action of the second transaction workflow.

13. The method of claim 9, further comprising:
    determining, by the orchestration service, that a second tracking log for a second transaction workflow indicates an inconsistent state;
    determining, by the orchestration service, based at least in part on the second tracking log, that a first action of the second transaction workflow has been completed and that a second action of the second transaction workflow has not been completed;
    determining, by the orchestration service using the first tracking log, that the second action of the second transaction workflow is not associated at the first tracking log with a failure state; and
    responsive to determining that the second action of the second transaction workflow is not associated with the failure state, requesting, by the orchestration service, that a third microservice executed the second action of the second transaction workflow.

14. The method of claim 9, further comprising determining, by the orchestration service, that a second tracking log for a second transaction workflow indicates an inconsistent state at least in part based on determining that a timestamp for a completed action of the second transaction workflow is older than a threshold age.

15. The method of claim 9, further comprising:
accessing, by the orchestration service, a first workflow metadata describing the first transaction workflow, wherein the first workflow metadata describes a plurality of actions of the first transaction workflow;
requesting, by the orchestration service, that a first microservice of the plurality of microservices execute the first action utilizing first microservice storage; and
requesting, by the orchestration service, that a second microservice of the plurality of microservices execute the second action.

16. The method of claim 9, wherein writing the first log entry to the first tracking log comprises sending a request to a tracking agent service executing at a second computing device, wherein the first tracking log is stored at a data storage device locally connected to the second computing device.

17. A non-transitory machine-readable medium comprising instructions thereon that, when executed by a processor unit, causes the processor unit to perform operations comprising:
writing to a first tracking log a first log entry for a first action of a plurality of actions of a first transaction workflow, wherein the first log entry describes an initial state of the first action, wherein the writing to the first tracking log comprises writing to the first tracking log at a persistent storage location;
writing to the first tracking log, a second log entry for a second action of the plurality of actions, wherein the second log entry describes an initial state of the second action;
determining, using the first tracking log, that a first microservice of a plurality of microservices for executing the first transaction workflow successfully completed the first action;
determining, using the first tracking log, that the second action is incomplete, wherein the second action was to be executed by a second microservice of the plurality of microservices;
determining that the second action is associated at the first tracking log with a failure state;
accessing, from the persistent storage location, workflow metadata describing the first transaction workflow;
determining that the workflow metadata indicates that the first action should be compensated; and
responsive to determining that the second action is associated with the failure state and the determining that the workflow metadata indicates that the first action should be compensated, requesting that the first microservice execute a compensation action to reverse the first action.

18. The machine-readable medium of claim 17, further comprising instructions thereon that, when executed by the processor unit, cause the processor unit to perform operations comprising:
accessing a first workflow metadata describing the first transaction workflow, wherein the first workflow metadata describes a plurality of actions of the first transaction workflow;
requesting that a first microservice of the plurality of microservices execute the first action utilizing first microservice storage; and
requesting that a second microservice of the plurality of microservices execute the second action.

19. The machine-readable medium of claim 17, further comprising instructions thereon that, when executed by the processor unit, cause the processor unit to perform operations comprising sending an alert message to an administrative user, wherein the alert message indicates that the compensation action has failed.

20. The machine-readable medium of claim 17, further comprising instructions thereon that, when executed by the processor unit, cause the processor unit to perform operations comprising:
determining that a second tracking log for a second transaction workflow indicates an inconsistent state;
determining based at least in part on the second tracking log, that a first action of the second transaction workflow has been completed; and
request that a third microservice execute a compensation action to reverse the first action of the second transaction workflow.

* * * * *